United States Patent
Scatchard

(12) 
(10) Patent No.: US 6,416,062 B1
(45) Date of Patent: Jul. 9, 2002

(54) KIT FOR CONVERTING A BICYCLE TO A SNOW BIKE

(76) Inventor: Brooke Oliver Scatchard, 697 Dorset St., Charlotte, VT (US) 05445

( * ) Notice: Subject to any disclaimer, the term of this patent is extended or adjusted under 35 U.S.C. 154(b) by 0 days.

(21) Appl. No.: 09/725,774

(22) Filed: Nov. 29, 2000

(51) Int. Cl.$^7$ ............................................. B62M 27/02
(52) U.S. Cl. ....................... 280/7.14; 280/12.14; 280/16
(58) Field of Search ................. 280/7.14, 7.12, 280/7.13, 12.1, 12.12, 12.14, 28.5, 16, 18, 21 A; 180/186, 185, 196, 227, 184, 9.25

(56) References Cited

U.S. PATENT DOCUMENTS

| | | | | |
|---|---|---|---|---|
| 469,227 A | * | 2/1892 | Bouse | 280/7.14 |
| 508,011 A | * | 11/1893 | Gould | 280/7.14 |
| 527,903 A | * | 10/1894 | Thanner | 280/7.14 |
| 556,350 A | * | 3/1896 | Dolphin | 280/7.14 |
| 800,186 A | * | 9/1905 | Vaughan | 280/7.14 |
| 850,125 A | * | 4/1907 | Baldauf | 280/7.14 |
| 1,068,883 A | * | 7/1913 | Frank | 280/7.14 |
| 1,268,229 A | * | 6/1918 | Frank | 280/7.14 |
| 1,281,980 A | * | 10/1918 | Kostewich | 280/7.14 |
| 1,337,396 A | * | 4/1920 | Eiselt | 280/7.14 |
| 3,561,778 A | * | 2/1971 | Brie | 280/7.14 |
| 3,915,468 A | | 10/1975 | Hoarreau | 280/12.1 |
| 4,027,891 A | | 6/1977 | Frame | 280/7.14 |
| 4,059,168 A | | 11/1977 | House | 180/1 P |
| 4,097,055 A | | 6/1978 | Laycraft | 280/16 |
| 4,168,841 A | * | 9/1979 | Uhlyarik | 280/7.12 |
| 4,390,151 A | * | 6/1983 | Schneider | 280/7.14 |
| 4,828,280 A | | 5/1989 | Kies | 280/12.14 |
| 5,102,153 A | | 4/1992 | Rhode | 280/7.14 |
| 5,423,559 A | | 6/1995 | Rhode | 280/12.14 |
| 5,482,302 A | | 1/1996 | Yu | 280/12.12 |
| 5,738,361 A | | 4/1998 | Landucci | 280/12.14 |

FOREIGN PATENT DOCUMENTS

| | | | | |
|---|---|---|---|---|
| DE | 3233455 | * | 3/1984 | 280/7.14 |
| FR | 2556303 | * | 12/1985 | 280/7.14 |

* cited by examiner

*Primary Examiner*—Brian L. Johnson
*Assistant Examiner*—Hau Phan
(74) *Attorney, Agent, or Firm*—Roger Aceto

(57) ABSTRACT

A kit for converting a conventional bicycle to a self-propelled snow bike. The kit includes a ski, an elongated member for mounting the ski to the front fork of a bicycle and a bias means for urging the ski to maintain a proper orientation as the ski pitches with respect to the elongated member. When the kit is attached to the front fork, the front end of the bicycle is raised so as to place more weight over the rear wheel for improved traction. Elevating the front end also provides greater ground clearance for the bicycle pedals so the bicycle may be pedaled even though the bike may settle into snow covered ground.

7 Claims, 2 Drawing Sheets

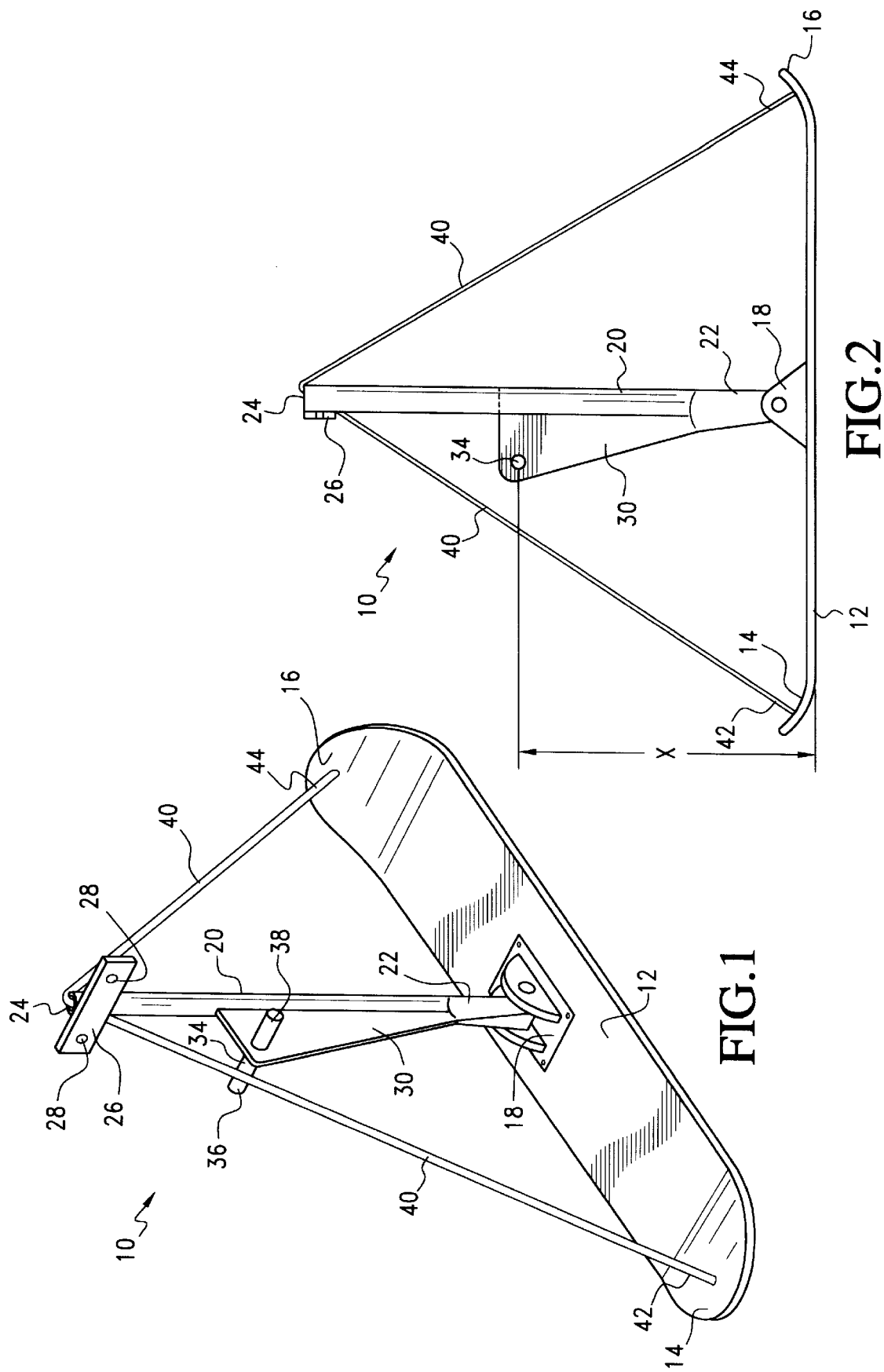

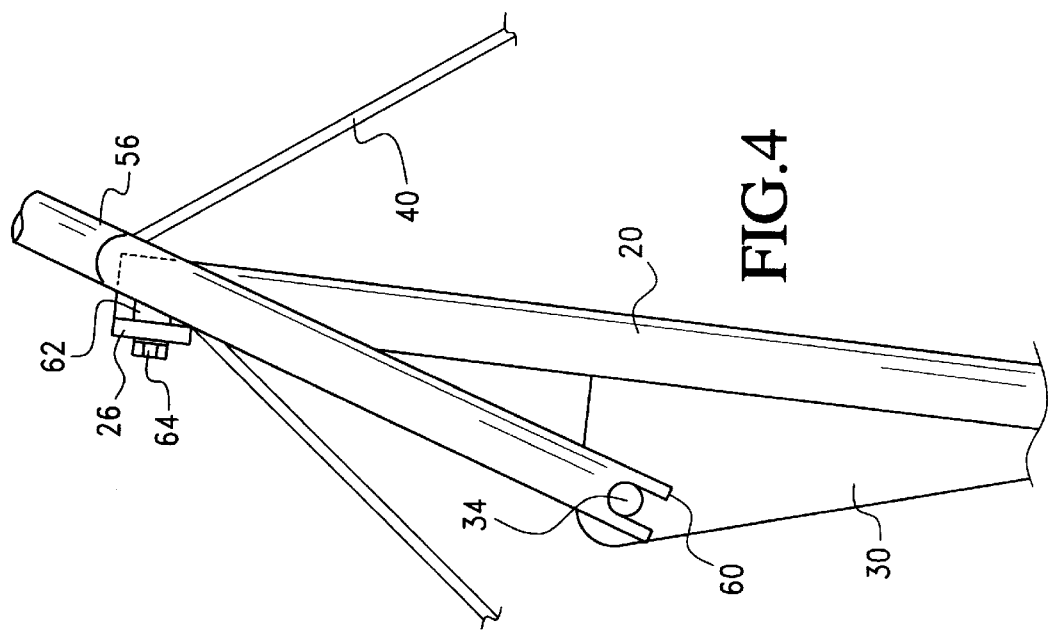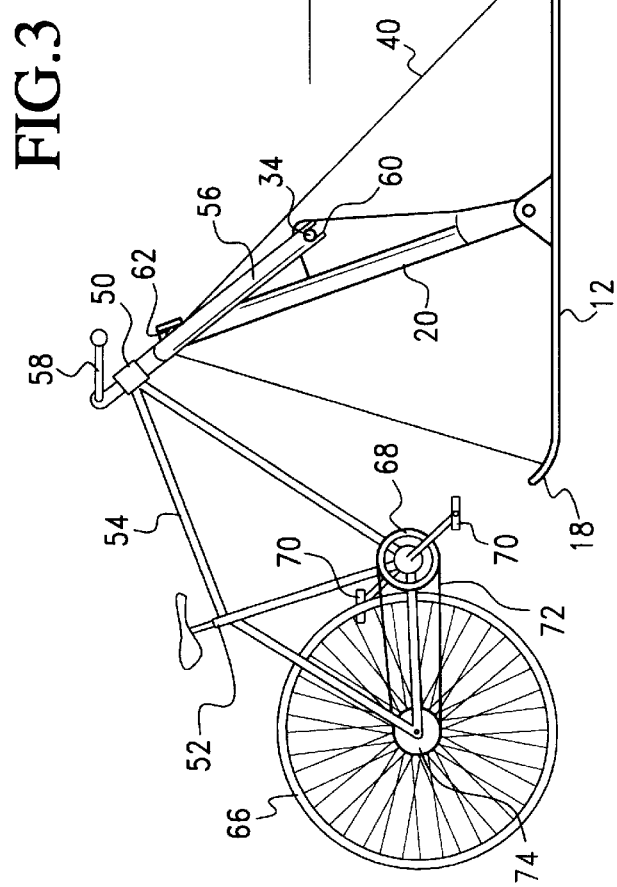

KIT FOR CONVERTING A BICYCLE TO A SNOW BIKE

TECHNICAL FIELD

The present invention relates to a self-propelled snow vehicle and more particularly to a kit for converting a conventional bicycle to such a snow vehicle.

BACKGROUND OF THE INVENTION

Bicycles or bicycle-type snow vehicles are known. One type is intended merely for down hill travel such as are shown in U. S. Pat. Nos. 4,097,055 and 4,027,891. The '055 Patent discloses a snow vehicle constructed of a bicycle-like fame supported on in-line front and rear skies wherein the front ski is steered by handlebars. The '891 Patent discloses a conventional bicycle frame wherein both wheels have been removed and replaced with skies. While this type of snow bicycle are usefull for down hill sledding, particularly in a ski lift accessed slope area, they are of little use for cross-country travel.

Self-propelled snow vehicles also are known. However, attempts to convert a bicycle to a self-propelled snow bicycle by installing a front ski in place of the front wheel have heretofore not been successful. One reason for this lack of success is that simply replacing the front wheel with a ski does not address the problem of poor traction of the vehicle on ice or snow so that propulsion is a problem. Another problem is that a front ski alone does not necessarily provide sufficient flotation to keep the pedals of the bicycle clear of the snow surface.

U. S. Pat. Nos. 3,915,468; 5,482,302; 5,102,153; 5,423,559 and 5,738,361 are illustrative of self-propelled snow vehicles. The vehicles disclosed in these patents have a front ski replacing the bicycle front wheel. It is recognized in these patents that traction on an ice or snow surface is a problem. Accordingly, in each of these patents the rear wheel is modified or replaced so as to accommodate an endless track. The endless track provides improved traction and also improves flotation by distributing the weight of the vehicle over a greater area. Accordingly, the modification to the drive system solves both the traction and flotation problems.

Major drawbacks of these self-propelled snow vehicles are the complication of the drive modifications and the expense of such extensive modifications to the drive system. Such complicated drive systems do not lend themselves to installation by the recreational bicycle owner and are impractical both from the standpoints of complexity, weight added to the bicycle and cost.

Accordingly, it is an object of the present invention to provide a kit that allows for a simple do-it-yourself modification to a conventional bicycle for converting the bicycle to a self-propelled snow bicycle.

Another object of the present invention is to provide a kit for converting a conventional bicycle to a snow bicycle that has improved traction.

A further object of the invention is to provide a self-propelled snow bicycle having improved traction without modification of the conventional chain and rear wheel drive system of the bicycle.

A still further object of the present invention is to provide a self-propelled, pedal powered snow bicycle that is easy to peddle on a snow surface.

Yet another object of the present invention is to provide a kit for converting a bicycle to a self-propelled snow bicycle having improved traction simply by replacing the front bicycle wheel with a ski.

SUMMARY OF THE INVENTION

The present invention provides a kit containing a few components for converting a bicycle to a snow bicycle having an enhanced performance in the snow. The kit, when assembled is then attached to the front fork of the bicycle. The attachment replaces the front wheel of the bicycle and includes a ski for both flotation and steering. In addition, the attachment of the kit to the front fork acts to improve the traction of the bicycle rear wheel so the snow bicycle may be self-propelled. Thus, the attachment provides improved traction without the need for extensive modification of the rear wheel such as by adding an endless track or a spiked wheel. In fact, the attachment to the front fork provides better traction for the rear wheel with no modification of the drive mechanism.

In this respect, the kit includes a front fork extension that attaches to the existing front fork of the bicycle and extends below the front wheel dropouts of the fork. At the lower end of the extension is a ski. The ski is journaled adjacent its midpoint to the fork extension lower end. The extension and ski together replace the front wheel of the bike. The length of the extension below the wheel dropouts is greater than the radius of the replaced bicycle wheel. Accordingly, with the extension in place, the entire front end of the bicycle is elevated to a position that is higher than its position when a wheel is attached to the fork.

Elevating the front end of the bicycle accomplishes several things. First, elevating the front end changes the center of gravity so as to locate more weight over the rear tire and reduce weight over the front ski. This rearward shift of weight improves traction and allows greater floatation of the front ski over snow covered ground. Elevating the front end of the bicycle further results in raising the crankshaft of the bicycle and increasing the clearance between the pedals and the ground. With the clearance increased, there is less likelihood of the pedals brushing or plowing into the snow cover as the bicycle settles into soft pack snow or as the bicycle is pedaled through deep snow.

In accordance with the present invention, the kit may be used with a conventional bicycle. Preferably the bicycle is of a type designed for off road travel such as a mountain bicycle or the like. Such a bike usually includes a frame including generally upright head and seat tubes connected by a generally horizontal top tube. A front fork is journaled to the head tube and has a pair of wheel dropouts for receiving the front wheel of the bicycle. The front fork has a pair of brake bosses to mount a center pull or cantilevered front brake mechanism on the bicycle. The upper end of the fork extends through the head tube and is attached to handle bars for steering the front wheel. A pedal driven chain drive provides motive power to a rear wheel.

The wheel dropouts and the brake bosses provide mounting locations for the assembled kit when the front wheel and front brake are removed. The kit of the present invention includes an extension for the front fork. The extension is an elongated member having a transverse rod intermediate its ends that is receivable into the wheel dropouts of the front fork and an upper end that is attachable to the brake bosses. Using both the brake bosses and the wheel dropouts to attach the elongated member to the front fork firmly anchors the member to the front fork and provides stability for the lower end of the member that extends down below the wheel dropouts.

A ski is attached to the lower end of the member. Preferably the ski is similar in construction to a stunt ski in that it has a relatively short and wide footprint (as compared to a downhill ski) and has an upturned leading edge and an upturned trailing edge. The ski is journaled adjacent its midpoint to the lower end of the elongated member so it can pitch up or down with respect to the member. A bias operative between the ski and member tends to maintain the ski in a generally horizontal position.

The length of the member extending below the wheel dropouts is greater than the radius of a wheel normally supported in the dropouts. This causes the front of the bicycle frame to tip upwardly so as to shift the center of gravity rearward and put more of the combined rider and bicycle weight over the rear wheel of the bicycle. More weight on the rear wheel improves traction. It also improves the flotation of the front ski and reduces the likelihood of an accident caused by the ski leading edge plowing into the snow-covered ground. Raising the front of the bicycle also elevates the bicycle pedals to increase the clearance between the pedals and the snow covered ground.

Accordingly, the present invention may be characterized in one aspect thereof by a kit for converting a conventional bicycle to a snow bicycle, the bicycle including generally upright head and seat tubes connected by a top tube, a front steering fork journaled to the head tube, handlebars for turning the steering fork, and the steering fork having and a pair of wheel drop outs for receiving the axle of a bicycle wheel and a pair of bosses for mounting a front wheel brake to the fork, and the kit comprising:

a) an elongated member having a lower end and an upper end;

b) a ski attachable to the elongated member lower end;

c) a bracket adjacent the upper end of the elongated member for removably attaching the member to the brake bosses;

d) a transverse rod intermediate the ends of the elongated member, the rod having opposite ends receivable into the wheel dropouts of the fork wherein the bracket and rod together cooperate to fix an upper portion of the elongated member to the front steering fork thereby extending the length of the steering fork; and e) the elongated member having a length as measured between the transverse rod and the lower end of the member that is greater than the radius of a bicycle wheel normally supported in the wheel dropouts so as to elevate the head tube of the bicycle to a position that is higher than its position when the fork is supported by a bicycle wheel.

DESCRIPTION OF THE DRAWINGS

FIG. 1 is a perspective view of the assembled kit of the present invention for converting a bicycle to a snow bicycle;

FIG. 2 is a side elevation view of the assembled kit shown in FIG. 1;

FIG. 3 is a schematic side elevation view on a smaller scale, of a bicycle converted to a snow bicycle using the conversion kit of the present invention; and FIG. 4 is a view on an enlarged scale of a portion of the snow bicycle shown in FIG. 3.

DETAILED DESCRIPTION OF THE INVENTION

Referring to the drawings, FIGS. 1 and 2 show the assembled kit generally indicated at 10, which will replace the front wheel of a bicycle. A first component of the kit is a ski 12. The ski is similar to an acrobatic ski in that it has an upturned leading edge 14 and an upturned trailing edge 16. The ski is relatively short as compared to its length so the ski has a relatively short and wide footprint. Mounted to a midsection is a journal 18

A second component of the kit is an elongated member 20 having a first end 22 and a second end 24. The elongated member 20 as shown is a section of angle iron but is not limited to this shape. The first end 22 is adapted to mount to the journal 18 so as to allow the ski to pitch with respect to the elongated member. When the ski and elongated member are assembled as shown, the elongated member is generally upright such that the first end 22 is a lower end and second end 24 is an upper end.

A mounting bracket 26 is fixed by any suitable means, such as welding, to the elongated member 20 adjacent the second (upper) end 24. The bracket extends transverse the second end 24 and has a pair of spaced openings 28. The space between the openings 28 is substantially equal to the spacing between to the front brake bosses of a conventional bicycle for purposes set out hereinbelow.

Intermediate the ends 22,24 of the elongated member is a brace 30. The brace is fixed to the elongated member and extends outwardly from the member in a forward direction. It is preferred that the spacer is tapered as shown. This structure stiffens and provides support for the elongated member when the assembled kit is attached to a bicycle as set out hereinbelow.

Fixed to the brace 30 is a transverse rod 34. The opposite ends 36,38 of the rod preferably are threaded and the distance "X" (FIG. 2) as measured between the rod and the lower end 22 of the elongated member is greater that the radius of a bicycle wheel replaced by the assembled kit. Preferably, the distance "X" is at least two inches and preferably up to eight inches, or more, longer than the radius of the replaced bicycle wheel.

A third component of the kit is a bias means 40. In the assembly, this bias means extends between the ends 14,16 of the ski and the elongated member 20. Preferably, the bias means is an elastic chord stretched between the ends of the ski and the elongated member. As shown in FIGS. 1 and 2, the chord 40 in the assembly has one end 42 attached to the ski leading edge 14 and a second end 44 attached to the ski trailing edge 16. Between its ends 42,44, the chord is stretched over the upper end 24 of the elongated member and passes behind the mounting bracket 26. Any suitable means (not shown) such as a screw and washer or a pressure fitting may be used to anchor the chord to the elongated member 20.

The elastic chord 40 preferably is adjusted so the tension exerted on the ends of the ski maintains the ski generally horizontal with the leading end of the ski in a slightly up orientation. The chord acts to dampen the pitch of the ski to maintain this orientation. For example, should the ski leading end 14 pitch down during travel, the length of the cord between the ski leading edge and member 20 stretches and increases tension so as to urge the ski back towards its original orientation. Likewise, should the ski leading edge pitch upward, the stretching and increased tension of the chord attached to the ski trailing edge tends to restore the ski to its proper orientation relative to the ground.

Reference now is made to FIG. 3 which shows the assembled kit of FIGS. 1 and 2 attached to a bicycle. The bicycle is conventional in that it has generally upright head and seat tubes 50,52 respectively connected by a top tube 54. Journaled to the head tube is a front fork 56. At its upper end, the fork is attached to handlebars 58 for steering the bicycle.

As best seen in FIG. 4, at its lower end, the front fork has a pair of wheel dropouts 60 that normally accommodate the axle of the bicycle front wheel. The fork also has a pair of brake bosses 62 for mounting the brake calipers (not shown) of the bicycle. The bicycle also has a rear wheel 66 (FIG. 3) and a drive for the rear wheel comprising a crank 68, pedals 70 and a chain 72.

Prior to attaching the assembled kit 10 to the bicycle, the front wheel is removed from the bicycle and the front brakes are removed from the brake bosses 62. To attach the assembled kit 10 to the bicycle, the rod 34 is received into the wheel dropouts 60 and fixed in place. A standard quick release mechanism (not shown) or nuts threaded to the rod ends 36,38 may be used to releaseably fix the rod in the wheel dropouts.

The bracket 26 then is attached to the brake bosses 62 by bolts 64 extending through the openings 28. In this. manner the elongated member 20 is fixed to the front fork and becomes an extension of the front fork. This extension of the fork causes the front of the bicycle including the head tube 50 to elevate. This is because the length "X" between the rod 34 and the ski 12 is greater than the radius of the wheel replaced by the assembly. Preferably the extension of the fork and increased length is sufficient to raise the front end of the bicycle up to eight inches or more higher than normal. Elevating the head tube changes the angle of the bicycle to the snow covered ground and rotates the frame of the bicycle about 18° about the rear axle 74 This causes the center of gravity of the bicycle to shift rearward so as to locate more weight over the rear wheel 66 and enhance traction.

Elevating the head tube also elevates the bicycle crank 68 and pedals 70. For example, it is preferred that the pedals, normally not more than three to four inches above the ground at the bottom of pedal rotation, are raised to about eight to nine inches above the ground at the bottom of pedal rotation. This additional height allows ground clearance for pedal rotation even if the rear wheel and front ski sink nine inches into the snow covered ground.

The bias means 40 between the fork extension 20 and ski ends 14,16 is arranged to urge the ski to a horizontal orientation as the ski pitches up and down when traveling over snow covered ground. Preferably, the bias means maintains the ski horizontal but with the ski leading end slightly elevated relative to the ski trailing end. This tends to prevent the leading end of the ski from plowing into the ground.

Thus it should be appreciated that the present invention accomplishes its intended objects in providing a kit that allows for a simple do-it-yourself modification to convert a conventional bicycle to a self-propelled snow bicycle at minimal cost and with minimal effort. The conversion provides the bicycle with improved traction on snow covered ground with out the need to modify the rear wheel drive. This is accomplished by a component of the kit that extends the length of the front fork to elevate the front of the bicycle so the orientation of the entire bicycle frame is rotated about the rear axle of the bicycle. This shifts the center of gravity rearward and places more weight over the rear wheel for better traction. Elevating the front end also provides greater ground clearance for the pedals so that settling of the bicycle into snow covered ground can be accommodated and still have the pedals clear the ground at the bottom of their rotation.

While an embodiment of the invention has been described, it should be appreciated that other modifications are apparent. For example, for even more traction, the rear tire can be replaced with a wide studded tire inflated to low pressure. Since the bicycle is pitched upward, a long seat similar to a "banana" seat can be used to improve balance by permitting the rider more fore and aft movement while seated. The bias means can be attached to the elongated member a location other than the top end of the member.

Having described the invention in detail, what is claimed as new is:

1. A kit for converting a conventional bicycle to a snow bicycle, the bicycle including generally upright head and seat tubes connected by a top tube, a front steering fork journaled to the head tube, handlebars for turning the steering fork, and the steering fork having and a pair of wheel dropouts at a lower end for receiving the axle of a bicycle wheel and a pair of bosses for mounting a front wheel brake to the fork, said kit comprising:

a) an elongated ski support member having a lower end and an upper end;

b) a ski attachable to a journal at said elongated member lower end such that said ski is free to pitch relative to said elongated member lower end:

c) said elongated member having mounting means attachable to the front steering fork including a transverse bracket fixed to said elongated member upper end and being attachable to the steering fork at a location above the wheel dropouts and a transverse rod fixed to said elongated member intermediate the ends thereof and being attachable to the wheel dropouts such that said elongated member lower end extends below the wheel dropouts to extend the length of the steering fork;

d) said elongated member having a length as measured from the dropouts to said elongated member lower end that is greater in length than the radius of a bicycle wheel normally supported in the wheel dropouts and said kit when mounted to the fork elevating the head tube of the bicycle to a position higher than the position of the head tube when the fork is supported by a bicycle wheel; and e) bias means extending between said elongated member and said ski that is reactive to the pitch of said ski about said journal to Hen the pitch of said ski and urge said ski to a generally horizontal orientation.

2. A kit for converting a conventional bicycle to a snow bicycle, the bicycle including a rear wheel, a pedal driven crank for driving the rear wheel, generally upright head and seat tubes connected by a top tube, a front steering fork journaled to the head tube, handlebars for turning the steering fork, and the steering fork having a pair of wheel drop outs at a lower end for receiving the axle of a bicycle front wheel and a pair of bosses for mounting a front wheel brake to the fork, said kit comprising:

a) a ski having a relatively short and wide footprint, said ski having an upturned leading end, a trailing ended a journal intermediate said ends;

b) an elongated member for extending the length of the steering fork, said member having an upper end and a lower end, said lower end being attachable to said journal to permit said ski to pitch about said journal with respect said elongated member;

c) a traverse bracket adjacent said elongated member upper end, said bracket having spaced bolt receiving openings for attaching said bracket to the brake bosses on the fork;

d) a brace fixed to said elongated member and extending outward in a leading direction from said member;

e) a traverse rod fixed to said brace, said rod having ends receivable into the wheel dropouts and the distance along said elongated member from said rod to said elongated member lower end being greater than the radius of a bicycle wheel normally mounted to the wheel dropouts, whereby said kit when assembled and mounted to said fork rotates the head tube upwardly about the rear wheel and elevates the head tube and pedal drive crank when a front wheel is mounted in the dropouts; and f) bias means between the elongated member and said ski urging said ski to maintain a generally horizontal orientation as said ski pitches about said journal with respect to said elongated member.

3. A kit as in claim 2 wherein said distance between said rod and said elongated member lower end is sufficient to raise said head tube up to eight inches higher than the height of said head tube when a front wheel is mounted in said dropouts thereby shifting the center of gravity of the bicycle towards the rear wheel and increasing the ground clearance of the pedal driven crank.

4. A kit as in claim 2 wherein said bias means is an elastic chord fixed to said elongated member and having distal ends connected to said ski leading end and ski trailing end.

5. A kit as in claim 2 wherein the ends of said rod are threaded to receive bolts for fixing said rod to the dropouts.

6. A kit as claimed in claim 2 wherein said bias means is an elastic chord, said chord having opposite ends connected to said leading and trailing ends respectively and said chord being connected intermediate said opposite ends to said elongated member.

7. A kit as in claim 6 wherein said elastic chord is arranged to urge said ski to a generally horizontal orientation with said ski leading end slightly elevated relative to said trailing end.

* * * * *

UNITED STATES PATENT AND TRADEMARK OFFICE
CERTIFICATE OF CORRECTION

PATENT NO.     : 6,416,062 B1
DATED          : July 9, 2002
INVENTOR(S)    : Brooke Oliver Scathard It is certified that error appears in the above-identified patent and that said Letters Patent is hereby corrected as shown below:

Column 6,
Line 41, cancel "Hen" and insert -- dampen --.
Line 53, cancel "ended" and insert -- end and --.

Signed and Sealed this

Nineteenth Day of November, 2002

Attest:

Attesting Officer

JAMES E. ROGAN
Director of the United States Patent and Trademark Office